May 16, 1950

N. F. ANDREWS 2,507,687

VEHICLE-MOUNTED HARVESTER WITH
TRAILING CROP-RECEIVING UNIT

Filed Jan. 5, 1945

INVENTOR.
NORMAN F. ANDREWS

WITNESS.

Patented May 16, 1950

2,507,687

UNITED STATES PATENT OFFICE 2,507,687

VEHICLE-MOUNTED HARVESTER WITH TRAILING CROP-RECEIVING UNIT

Norman F. Andrews, Moline, Ill., assignor to Deere & Company, Moline, Ill., a corporation of Illinois Application January 5, 1945, Serial No. 571,703

3 Claims. (Cl. 56—15)

The present invention relates generally to tractor mounted agricultural implements and more particularly to tractor mounted harvesting machines, and the principal object of my invention relates to the provision of a novel and improved harvester that is mounted in such a position that the tractor operator has a clear view of the crop as it is severed in the field and conveyed into the crop treating body.

A further object of my invention relates to the provision of a tractor mounted implement that is quickly and easily installed on the tractor and quickly and easily removed therefrom.

Still another object relates to the provision of a novel and improved tractor mounted corn picker, having provision for shelling the kernels from the cobs and for collecting the kernels in a receptacle built into the machine.

A still further object relates to the provision of a novel and improved means for mounting a harvesting machine on a tractor including a provision for vertical adjustment of the gathering devices relative to the tractor but providing for carrying a portion of the weight of the crop treating body on a pair of separate wheels to relieve a portion of the weight from the tractor.

Figure 1:
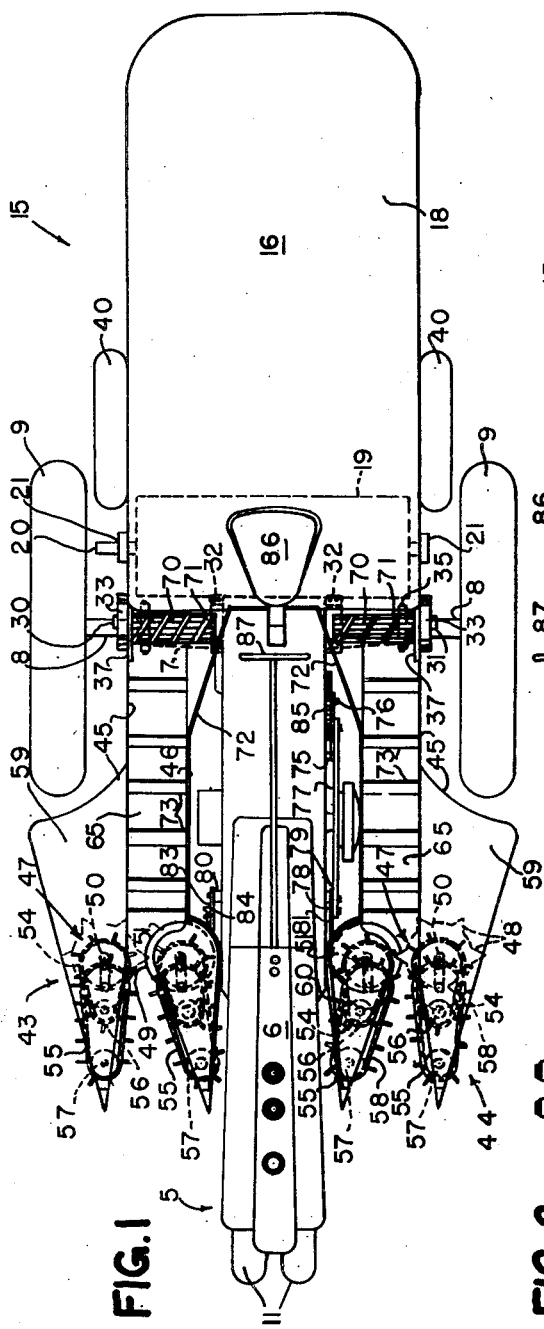
Figure 2:
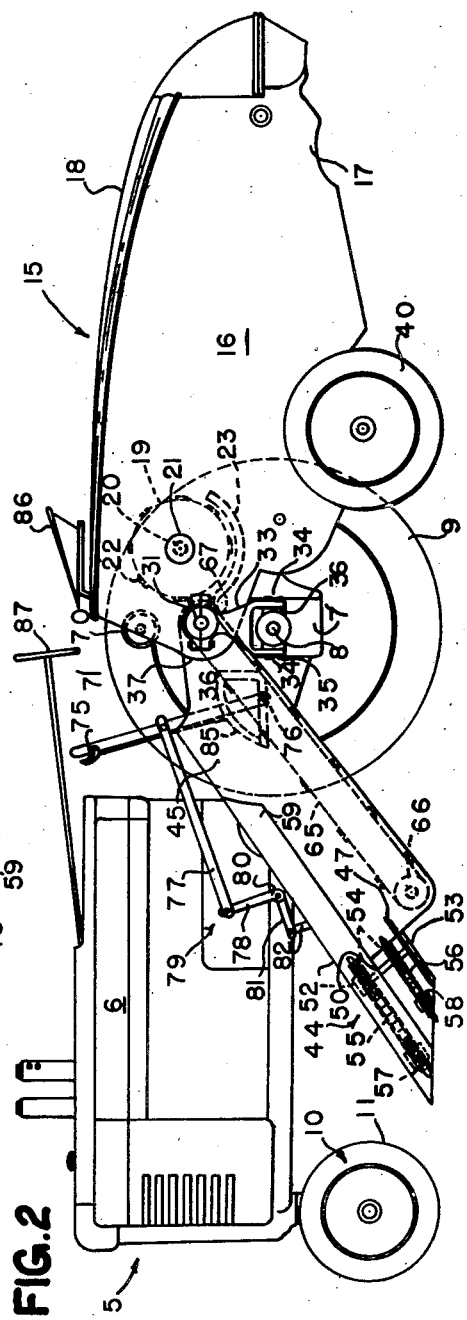

These and other objects and advantages of my invention will be apparent to those skilled in the art after a consideration of the following description, in which reference is had to the drawing appended hereto, in which Figure 1 is a plan view of a tractor-mounted corn picker and sheller, embodying the principles of my invention and Figure 2 is a side elevational view of the same implement, with the near traction wheel removed.

Referring now to the drawings, the tractor, indicated in its entirety by the reference numeral 5, is of the tricycle type, including a narrow longitudinally extending frame or body 6 having a pair of laterally extending rear axle housings 7 on opposite sides of the body 6, respectively. A pair of supporting axles 8 are journaled in the axle housings 7 and carry at their outer ends a pair of rear traction wheels 9, respectively. The forward end of the tractor body 6 is carried on a dirigible truck 10, including a pair of closely spaced wheels 11.

The machine is indicated in its entirety by the reference numeral 15 and comprises front and rear articulated sections or units, the rear section or unit 16 comprising a crop-receiving body having a pair of side walls 17 and an arched roof 18 forming an enclosure or housing within which is disposed a crop-treating device which may be a more or less conventional threshing cylinder 19 mounted on a transversely disposed shaft 20, which is journaled in a pair of bearings 21 mounted on opposite side walls 17, respectively. The threshing cylinder 19 is provided with the usual threshing bars 22, which cooperate with a stationary concave 23 disposed beneath the threshing cylinder 19.

The forward end portion of the crop-receiving body 16 is swingably supported or articulately sustained on the rear axle housings 7 of the tractor 5 by means of a mounting pivot comprising a pair of transversely disposed coaxial shafts 30, 31, which are disposed above the axle housings 7, respectively, and are each journaled in a pair of inner and outer pedestal type bearings 32, 33, each of which is provided with a pair of legs 34 which straddle the axle housings 7 and which are rigidly secured by bolts 35 to implement supporting bosses 36 provided on the front and rear sides of the axle housings, as on any conventional farm tractor. The side walls 17 of the body 16 are extended forwardly, as indicated at 37, and are journaled on the shafts 30, 31, thus providing for a vertical swinging movement of the crop-treating body or unit 16 about the transverse axis of the shafts 30, 31.

The body 16 extends rearwardly from its forward support on the shafts 30, 31, and has its rearward portion carried on a pair of laterally spaced ground-engageable supporting wheels 40, which are located between the tractor wheels 9 and as close to the rear axle of the tractor as possible so that the tractor can be turned in either direction without an excessive amount of lateral skidding of the wheels 40, thereby eliminating the necessity for making the latter castering or dirigible, although it is to be understood that my invention is not limited to any particular kind of mountings for the implement wheels 40.

The forward section or unit of the machine 15 is a harvesting unit in the form of a pair of laterally spaced gathering means or devices 43, 44, each of which comprises a frame pivotally mounted at its rear end portion on the shafts 30, 31, and inclined downwardly and forwardly therefrom alongside the longitudinally extending body 6 and in advance of the rear wheels, the two gathering devices 43, 44 being disposed on laterally opposite sides of the tractor body 6, respectively. Each gathering device has inner and outer walls 45, 46 spaced apart laterally and extending longitudinally from front to rear of the device to define a longitudinally extending crop passage.

The forward end of each of the gathering devices 43, 44 is provided with a crop-severing mechanism in the form of a rotary knife 47 having a plurality of radially extending blades 48. The blades 48 cooperate with a rotatable disk 49, and the knife 47 and disk 49 are mounted on the opposite sides of the crop-gathering device on shafts 50, 51, respectively, which are each journaled on upper and lower bearings 52, 53 as best shown in Figure 2. Each of the shafts 50, 51 also carries a pair of vertically spaced sprockets 54, over which are trained a pair of upper and lower gathering chains 55, 56, which extend forwardly and downwardly and are trained around a pair of front and rear sprockets 57, 58, respectively.

The outer walls 45 are curved upwardly and outwardly, as shown at 59, serving as shields which guide any broken or fallen stalks into the gathering device between the walls 45, 46. The inner walls 46 are also curved upwardly and inwardly, as indicated at 60, to serve as the inner gathering shields.

The severed crops fall upon a conveying means in the form of a flexible endless conveyor device 65 disposed between the side walls 45, 46 and having an upper flight which receives the severed crops and moves upwardly and rearwardly toward the rear end of the harvester unit, which comprises a crop-discharge element adapted to deliver the crops into the forward end or crop-entry element of the crop-receiving body 16. The conveyor 65 is trained over a roller 66, which is disposed transversely near the forward end of the gathering device adjacent the severing knife, and the upper end of the conveyor 65 is trained over an upper roller or member 67, which is fixed coaxially to the shaft 31. Suitable driving means (not shown) are provided for driving each of the shafts 30, 31 to drive the conveyors 65 in such a direction that the upper flights thereof move upwardly and rearwardly. Thus, it will be evident that the shafts 30, 31 serve a three-fold purpose: to support and drive the conveyor rollers 67, to pivotally support the forward end of the crop-receiving housing 16 on the tractor, and to pivotally support the rear ends of the two gathering units 43, 44, independently of the body 16.

The power-transmitting connections from the tractor engine to the gathering and threshing mechanism are omitted from the drawings and description in the interest of simplicity, for such connections do not form any part of the present invention, and may be of any type known to those skilled in the art.

The severed crops move upwardly and rearwardly on the conveyors 65 and pass between the upper ends of the conveyors 65, as they pass around the rollers 67, and crop-transfer means including rotary devices in the form of upper feed rollers 70 which are rotatably supported in the front end or crop-entry element of the body 16 and which are respectively directly above the upper conveyor rollers 67 of the gathering devices 43, 44. Each of the feed rollers 70 extends inwardly beyond the inner edge of the conveyor 65 associated therewith, and is provided with a helical vane 71 which spreads the crops laterally; and the inner walls 46 of the gathering means are inclined laterally inwardly, as indicated at 72, to widen the upper ends of the gathering means to accommodate such spreading of the crops so that the crops may be distributed in a wider stream to the threshing cylinder 19. The conveyors 65 are each provided with transverse slats 73 to engage the severed crops in the usual manner.

The gathering units 43, 44 are raised and lowered angularly about the axis of the shaft 31 by means of a hand lever 75, which is pivotally mounted at 76 on the side of the tractor body 6 for angular movement about a transverse axis. The lever 75 is connected by means of a link 77 to the upper arm 78 of a bell crank 79, which is fixed to a transverse rockshaft 80 journaled on the frame of the tractor and extending transversely beneath the body 6. The second arm 81 on the bell crank 79 extends forwardly from the rockshaft 80 and is connected to a link 82 with the gathering unit 44. The opposite end of the rockshaft 80 is provided with a forwardly extending arm 83 which is connected through a link 84 with the opposite gathering device 43. Thus, rearward movement of the raising lever 75 effects rocking of the rockshaft 80 in a clockwise direction (as viewed in Figure 2), thereby raising the forward ends of the gathering devices 43 and 44 simultaneously. Each gathering device may be secured in adjusted position by means of latch and sector means 85.

During operation, the operator sits on the tractor seat 86 and guides the tractor by means of conventional steering gear 87 to guide the front wheels 11 between the crop rows, while the rear wheels 9 of the tractor and the supporting wheels 40 of the implement travel outside the two rows being harvested. The gathering chains 55, 56 gather the crops or stalks inwardly to be severed by the knife blades 48 in cooperation with the disks 49, and the crops fall upon the conveyors 65 which deliver them upwardly and rearwardly over the tractor axle housings 7 to the threshing cylinder 19. The threshing cylinder 19 separates the kernels from the stalks, or in the case of corn, shells the kernels from the cobs. Some variations can be made in the gathering and severing mechanism to accommodate various types of crops, as is well known to those skilled in the art, but it will be evident that in general, the machine shown and described herein comprises, in its preferred embodiment, a more or less conventional combine having the pair of laterally spaced gathering units 43, 44 extending on opposite sides of a conventional tractor 5. During operation, the gathering device is held in vertically adjusted position relative to the tractor, while the trailing crop-receiving body 16 may move up and down about the axis of the shafts 30, 31 as its supporting wheels 40 follow the contour of the ground.

The machine can be easily removed from the tractor by removal of the bolts 35 which hold the brackets 33 in place on the axle housings 7, disconnection of the lifting links 82 and any power connections between the tractor and the implement, and raising of the gathering units 43, 44 above the elevation of the tractor axle housings 7, after which the tractor may be drawn forwardly from between the gathering units 43, 44.

I do not intend my invention to be limited to the exact details of the preferred embodiment shown and described herein, except as set forth in the claims which follow.

I claim:

1. An agricultural machine, comprising: a frame having front and rear ends and sustained at least at its rear end by ground-engaging wheel means for movement over a field of crops; a harvesting unit positioned adjacent the frame, and having crop-gathering means in advance of the wheel means, a rear mounting portion adjacent the rear end of the frame, and a rear crop-discharge element; means articulately sustaining the rear mounting portion of the harvesting unit on the rear end of the frame and providing for vertical movement of the crop-gathering means relative to the frame; a crop-receiving unit in trailing relation to the frame and having forward and rearward ends; said forward end including a mounting portion adjacent the rear end of the frame, a crop-entry element adjacent the crop-discharge element of the harvesting unit, and a crop-treating device adjacent the crop-entry element; means articulately sustaining the mounting portion of the crop-receiving unit on the rear end of the frame and providing for vertical movement of the crop-receiving unit relative to the frame and relative to the harvesting unit; ground-engaging wheel means rearwardly of said last named sustaining means and rearwardly of the frame wheel means, for sustaining the crop-receiving unit; and crop-transfer means between the crop-discharge element of the harvesting unit and the crop-entry element of the crop-receiving unit for feeding crops from the crop-discharge element of the gathering unit through the crop-entry element to the crop-treating device, said crop-transfer means including a member arranged with respect to both sustaining means so as to maintain its relation to the crop-treating device irrespective of relative movement between said units.

2. The invention defined in claim 1, further characterized in that: the two sustaining means are coaxial on a transverse axis, and the crop-transfer member is rotatable on a proximate parallel axis.

3. The invention defined in claim 2, further characterized in that: the gathering means includes a conveyor device having a rotatable member on the axis of the two sustaining means.

NORMAN F. ANDREWS.

REFERENCES CITED

The following references are of record in the file of this patent:

UNITED STATES PATENTS

| Number | Name | Date |
|---|---|---|
| 1,811,055 | Kranich | June 23, 1931 |
| 1,815,273 | Ronning | July 21, 1931 |
| 1,931,782 | Week | Oct. 24, 1933 |
| 2,022,339 | Cleavinger | Nov. 26, 1935 |
| 2,133,905 | Rund, Jr. | Oct. 18, 1938 |
| 2,252,691 | Arndt | Aug. 19, 1941 |
| 2,287,379 | Kiehl | June 23, 1942 |
| 2,333,901 | Swenson | Nov. 9, 1943 |
| 2,348,634 | McEachern | May 9, 1944 |